(12) United States Patent
Heemskerk et al.

(10) Patent No.: US 6,310,838 B1
(45) Date of Patent: *Oct. 30, 2001

(54) RECORD CARRIER AND APPARATUS FOR SCANNING THE RECORD CARRIER

(75) Inventors: Jacobus P. J. Heemskerk; Gijsbert J. Van Den Enden, both of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,861

(22) Filed: Aug. 18, 1998

(30) Foreign Application Priority Data

Sep. 3, 1997 (EP) .................................................. 97202714

(51) Int. Cl.$^7$ ....................................................... G11B 7/09
(52) U.S. Cl. .................. 369/30.1; 369/275.3; 369/44.26
(58) Field of Search ............................. 369/274.3, 274.4, 369/32, 44.26, 30.1

(56) References Cited

U.S. PATENT DOCUMENTS

| | | | |
|---|---|---|---|
| 4,858,221 | * 8/1989 | Romeas ........................ | 369/275.4 X |
| 5,452,284 | 9/1995 | Miyagawa et al. .................. | 369/124 |
| 5,616,390 | 4/1997 | Miyagawa et al. ................. | 428/64.1 |
| 5,936,932 | * 8/1999 | Nakane et al. ................. | 369/275.4 X |
| 6,064,644 | * 5/2000 | Miyamoto et al. ........ | 369/275.4 OR |
| 6,069,869 | * 8/1999 | Nagasawa et al. ........... | 369/275.4 X |

FOREIGN PATENT DOCUMENTS

| | | |
|---|---|---|
| 0656625A1 | 6/1995 | (EP) . |
| 0727779A1 | 8/1996 | (EP) . |
| 0757343A1 | 2/1997 | (EP) . |

\* cited by examiner

*Primary Examiner*—Aristotelis Psitos
(74) *Attorney, Agent, or Firm*—Michael E. Belk

(57) ABSTRACT

An optical record carrier comprises substantially parallel tracks being divided into recording units having an address area (23,24), adjacent address areas of adjacent tracks (43, 44) comprising shared address marks (48). Shared address marks (47,48) are positioned in between adjacent tracks and arranged in sharing portions (40,41) of the address area, each sharing portion sharing address marks only to one side. The address area also comprises a free portion (39) which is free from shared address marks, which free portion is aligned with a sharing portion (42) of an adjacent address area. This is advantageous for reducing crosstalk in the address read signal. The sequence of the free and sharing portions within an address area differs so as to be matching in adjacent address areas. Further an apparatus for scanning the record carrier is described, which apparatus comprises an optical system (52) for generating a spot (66) on the record carrier via a radiation beam (65), tracking means (51), address recovery means (50,56) and positioning means (54) for moving the spot to a desired track. The address recovery means (50,56) are arranged for detecting the free portion and deriving the sequence of the free and sharing portions.

8 Claims, 3 Drawing Sheets

RECORD CARRIER AND APPARATUS FOR SCANNING THE RECORD CARRIER

FIELD OF THE INVENTION

The invention relates to a record carrier comprising substantially parallel tracks for recording optically readable marks representing information, the tracks being divided in longitudinal direction into recording units having an address area, adjacent address areas of adjacent tracks being substantially aligned in a direction transverse to the tracks and comprising shared address marks representing address information, the shared address marks being positioned in between the adjacent tracks to be readable from both adjacent tracks, and arranged in at least one sharing portion of the address area, the sharing portion sharing address marks only with a sharing portion of an address area adjacent to one side.

The invention further relates to an apparatus for scanning the record carrier, which apparatus comprises an optical system for detecting the optically readable marks by generating a spot on the record carrier via a radiation beam, tracking means for controlling the position of the spot in a direction transverse to the tracks, address recovery means for recovering the address information by reading the shared address marks in the at least one sharing portion of the address areas and positioning means for moving the spot to a desired track on the basis of the address information.

BACKGROUND OF THE INVENTION

Such a record carrier and apparatus are known from European Patent Application EP 0 727 779, document D1 in the list of related documents. The document discloses a record carrier in the form of an optical disk having a spiral pattern of grooves and lands on a substrate, constituting substantially parallel recording tracks. The recording tracks are subdivided in longitudinal direction into recording units, wherein a section of a groove or land serves as recording area, which section is preceded by an address area comprising pre-recorded address marks, called pre-pits. The address marks represent address information for positioning a recording head on a desired track and are indicative for the address of the recording area following the address area. In a direction transverse to the tracks the address marks are disposed in between the recording tracks, i.e. in between the virtual centre-lines of the recording tracks comprising said optically readable marks. In longitudinal direction the address marks are positioned in the address area, i.e. in a flat area interrupting the groove/land pattern, on a virtual extension of the boundary between a groove and a land. When scanning a track a radiation spot is centred on the track and the address marks are detectable off-centre, i.e. at a distance in a direction transverse to the tracks, on both sides of a virtual extension of the centre line of the track in the address area. So the address marks are shared by adjacent tracks and are readable equally well from both adjacent tracks. The address area is divided longitudinally in portions, and first address marks shared with the track on one side are in a portion of the address area called a sharing portion, and a further sharing portion comprises second address marks shared with the track on the other side. The apparatus comprises an optical system for recording or reading information by generating a spot via a radiation beam on a track of the record carrier. The record carrier is rotated and the spot is positioned in radial direction on the centre of the track by tracking means for scanning the track. During scanning the first address marks are read from the first sharing portion, and thereafter the second address marks are read from the further sharing portion and the address information is recovered. Tracking offset is detected by comparing the read signals from the first and second sharing portion, e.g. by comparing the amplitude of said read signals of the address marks. For detecting the tracking offset it is required that the address marks are positioned off-centre, because the read signal of such address marks will increase if the spot has an offset to that side and decrease if the offset is to the other side. Inherently, the read signal of the address marks is rather weak, because the spot is centred on the track and the address marks are off-centre. A stronger read signal would be available if address marks were positioned on the centre line, but centred address marks cannot easily be used to generate an offset signal, because the read signal decreases similarly for offsets to both sides. So the known record carrier and apparatus have the problem, that the address marks are off-centre and generate a weak and noisy read signal, and therefore errors in the recovery of the address information may occur.

SUMMARY OF THE INVENTION

It is an object of the invention to provide means for a more reliable recovery of address information.

For this purpose a record carrier as described in the opening paragraph is characterized according to the invention in that at least one address area comprises a free portion which is free from shared address marks, the free portion being transversely aligned with a sharing portion of an adjacent address area, the sequence of the free and the at least one sharing portion within an address area being different in the adjacent address areas. The free portion has the effect, that at the location where address marks are shared with the track adjacent to one side, the address area of the track adjacent to the other side is empty. So a sharing portion of the address area has a free portion adjacent to the other side. This is advantageous in that the read signal is less noisy, because no interference from marks in the track adjacent on the other side opposite to shared address marks is present. The at least one sharing portion and the free portion are arranged in different sequences in adjacent address areas, so as to create a pattern of sequences in consecutive tracks, each next sequence matching the sharing portions of the previous sequence by free portions and vice versa. This is advantageous, in that the additional area required for the free portion is relatively small and therefore the storage capacity of the record carrier is only marginally decreased by the overhead due to the free portions.

For the purpose mentioned above an apparatus as described in the opening paragraph is characterized according to the invention in that the address recovery means are arranged for detecting the free portion of the address area and deriving the sequence of the free and the at least one sharing portion. As the sequence of the free portion and the at least one sharing portion is different in different tracks, the address recovery means are arranged for deriving the respective sequence of portions of the address area. When the sequence and the timing of the read-out signal of the address marks are known, the boundary of the address area is known and the actual recording or reading of information can be started on the right moment. Detecting the free portion has the effect, that address information is only recovered from the read signal of the address area when address marks are present, so that the read signal from the free portion of the address area is not falsely considered to comprise address information. This is advantageous in that the address information from the sharing portions is recovered reliably and no false address information is detected in the free portion.

The invention is also based on the following recognition relating to a source of noise in the read signal. Although schematically a spot is often depicted as a sharp-edged well-defined circular shape of a diameter approximately equal to the track pitch, a real spot has an intensity gradually decreasing from the centre to a radial distance considerably larger than the track pitch. In the prior art record carrier of D1 the desired address marks are at 1/2 track pitch to one side, but unwanted address marks are at 3/2 track pitch to the other side. The unwanted address marks in D1 are also partly illuminated by the outer part of the spot, and therefore cause unwanted interfering signal components, to be called crosstalk. The crosstalk is the more disturbing, because the read signal itself is relatively weak due to the desired address marks being positioned off-centre and illuminated by half of the spot. The signal to noise ratio is even worse when the spot has some offset, as in that case the read signal gets weaker and the crosstalk stronger. Further it has to be noted, that the marks in the address area are usually created by pits have a predetermined depth chosen in relation to the wavelength of the reading laser beam. Laser light reflected from the bottom of the pit interferes with laser light reflected from the surface causing extinction. Such effects are called phase effects and cause relatively strong crosstalk. Marks written in the tracks in the recordable area are usually effected by changing the reflectivity of the recording layer, e.g. a phase change layer, and cause amplitude changes in the reflected laser light and are called amplitude effects. Such amplitude effects cause relatively little crosstalk. So the crosstalk problem is more severe in the address area, because there marks constituted by phase effects are used. In the record carrier according to the invention the source of the crosstalk in the address areas is removed by putting the unwanted address marks at a greater transverse distance, i.e. at least 5/2 track pitch to the side opposite the desired address marks. This is achieved by aligning a portion free of address marks with the sharing portion where the address marks are to be read. The invention is especially advantageous for high density recording, wherein the track pitch is designed to be relatively small in relation to the spot size.

Further advantageous, preferred embodiments of the apparatus and detection unit according to the invention are given in the dependent claims.

These and other aspects of the invention will be apparent from and elucidated further with reference to the embodiments described by way of example in the following description and with reference to the accompanying drawings, in which FIG. 1 shows a record carrier, FIG. 2 shows two tracks and aligned address areas FIGS. 3 and 4 show a number of tracks and shared address marks.

Corresponding elements in different Figures have identical reference numerals.

Figure 1A:
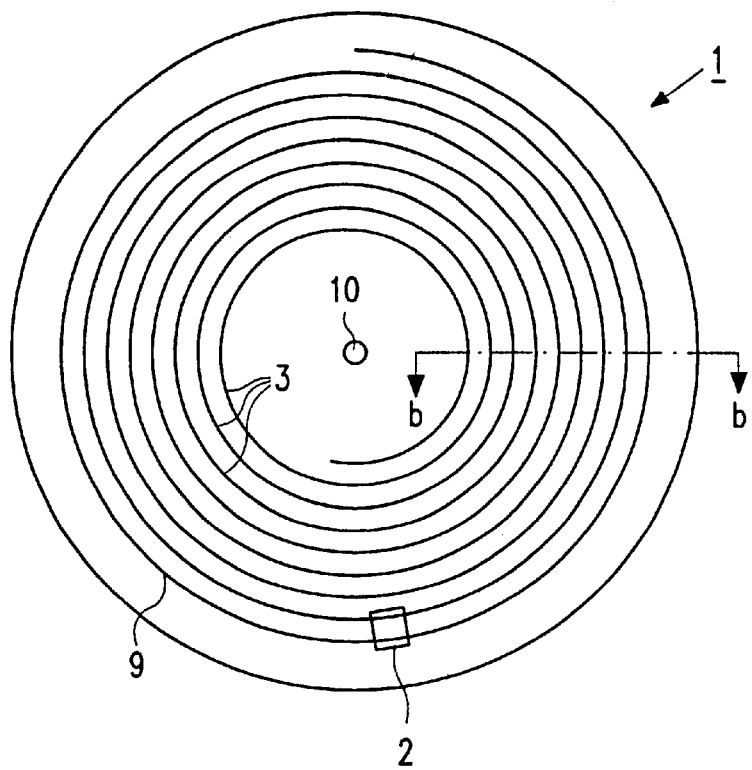

FIG. 1a shows a disc-shaped record carrier 1 having a track 9 intended for recording and a central hole 10. The track 9 is arranged in accordance with a spiral pattern of turns 3 constituting substantially parallel tracks. The track 9 on the record carrier is indicated by a pre-embossed track structure provided during manufacture of the blank record carrier. The track structure is constituted, for example, by a pregroove 4 which enables a read/write head to follow the track 9 during scanning.

Figure 1B:
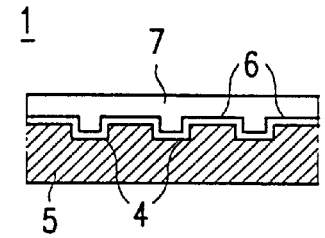

FIG. 1b is a cross-section taken along the line b—b of the record carrier 1, in which a transparent substrate 5 is provided with a recording layer 6 and a protective layer 7. The pregroove 4 may be implemented as an indentation or an elevation, or as a material property deviating from its surroundings.

Figure 1C:
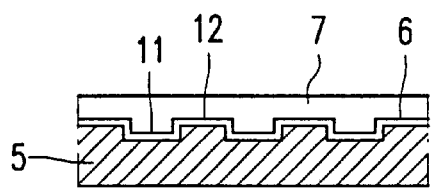

FIG. 1c shows an alternative track structure consisting of alternating elevated and deepened tracks, called lands 11 and grooves 12. It is to be noted, that both lands 11 and grooves 12 serve as recording tracks. Each turn has at least one flat area interrupting the lands and grooves, and at least once per turn a transition from land to groove or vice versa is established by switching to the other type after the flat area.

The parallel tracks are subdivided in recording units, which are individually accessible for reading or recording. A recording unit comprises a recordable portion of the track for recording optical marks representing user information, preceded by an address area comprising address marks representing address information. For the spiral land/groove pattern, the flat area serves as address area. Address marks on a recordable type of record carrier are usually embossed during manufacture to enable positioning of the read/write head anywhere on the still unrecorded record carrier. Recording units are usually called physical sectors, while the address marks denote consecutively numbered physical sector addresses. A logical subdivision of data to be recorded, in so-called logical sectors, may coincide with the physical sectors. However the size of a recording unit may be different from the size of a logical sector, whereas the minimum number of logical sectors recorded at one time may depend on error correcting rules applied during recording. The address marks constitute headers which are indicative of an address and indicate the start of the area for recording an information block. The invention is applicable in a corresponding manner to other track patterns having substantially parallel tracks, in which the turns are concentric instead of spiral, or to record carriers of different shapes, such as optical tape. The recording layer 6 may be optically or magneto-optically (MO) writable by means of a device for writing information, for example as in the known CD-Recordable system. During writing, the recording layer is locally heated by a beam of electromagnetic radiation, such as laser light. The recording layer in a re-writable record carrier is constituted, for example, by a phase-change material which acquires an amorphous or crystallized state when it is heated to the correct extent. Such a re-writable disc called DVD-RAM is provided in the DVD (Digital Versatile Disc) family of high-density optical discs.

Figure 2:
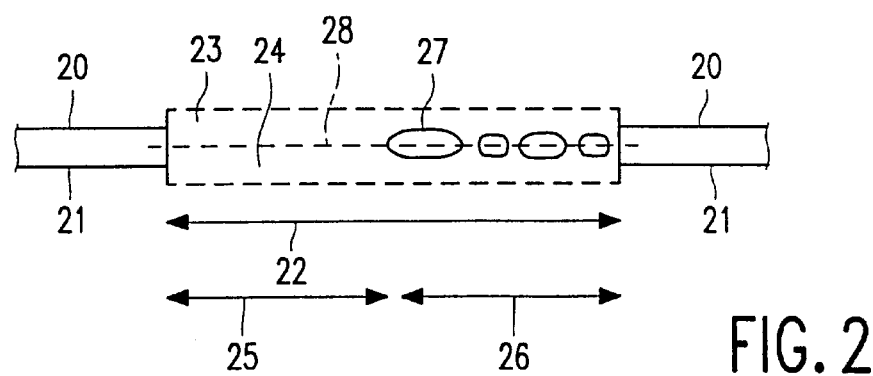

FIG. 2 shows an enlargement of the rectangle 2 in FIG. 1, revealing two tracks and aligned address areas. A first track 20 indicated by its centre-line is interrupted by address area 23 indicated by a dashed rectangle. After the address area 23 the first track 20 continues. An second track 21 directly adjacent to the first track 20 is interrupted by address area 24 and continues thereafter. The address areas 23 and 24 are aligned in a direction transverse to the tracks. The length of the address areas is indicated by arrow 22, which length is subdivided in portions 26 having shared address marks 27, called sharing portions, and portions 25 being free of address marks, called free portions. The shared address marks are in between the tracks 20 and 21, i.e. in between the virtual centre lines of both tracks, to be properly readable from both tracks. Preferably the shared address marks 27 are halfway between both tracks for generating read signals of equal strength when reading either the first track 20 or the second track 22. Alternatively the marks are distributed in a predetermined pattern at predefined distances other then halfway generating a stronger read signal in one track and a weaker signal in the other. In FIG. 2 the address area 23 of the first track starts with a free portion followed by a sharing portion sharing address marks 27 with the second track 21 and the shared address marks 27 are on the virtual extension 28 of the boundary between the adjacent tracks 20 and 21.

Figure 3:
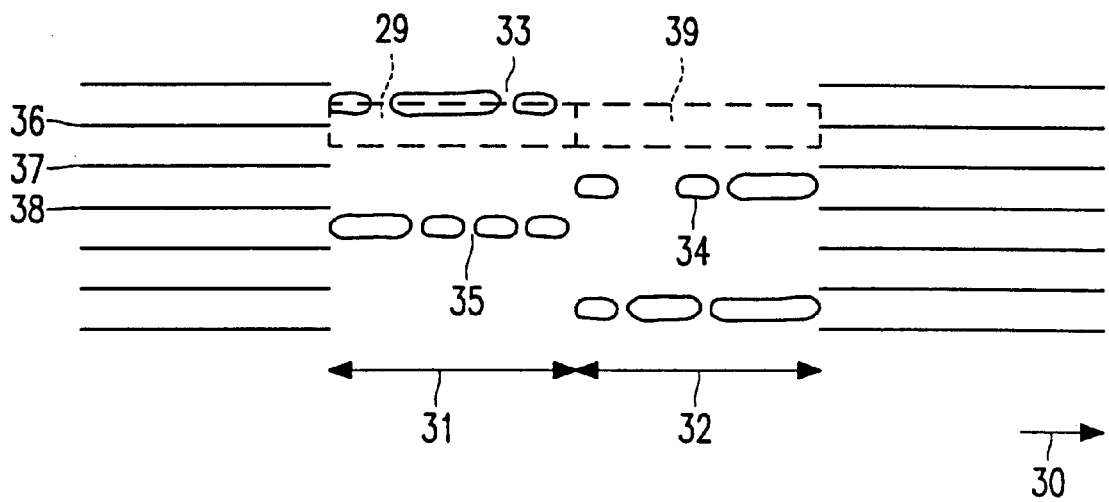

FIG. 3 shows a section of the record carrier having a number of tracks indicated by their centre-lines and aligned address areas. The address areas are subdivided in a first portion 31 and a second portion 32. The first track 36 shares the address marks 33 with the left adjacent track (seen in the scanning direction indicated by arrow 30) in the first portion 31 of the address area, to be called a left sharing portion 29 indicated by a dashed rectangle, and has as its second portion a free portion 39, which free portion has no shared address marks. The second track 37 has a free portion as its the first portion, and has shared address marks 34 with the track 38 adjacent to the right in the second portion (called a right sharing portion). The third track 38 first has right shared address marks 35 in a right sharing portion, and thereafter left shared address marks 34 in a right sharing portion. The next track has a sequence corresponding to the first track 36, etcetera. So the following sequences of portions of the address area occur for three consecutive tracks: left+free, free+right and right+left, constituting a repetitive pattern of sequences repeated every three tracks. In one out of three address areas, i.e. the one comprising a right+left sharing portion, an immediate comparison of the read signals of left and right shared address marks is possible to enable tracking offset detection, as described for the scanning apparatus below. The other shared address marks may also be used for offset detection, but in that case a memory is required for storing the read signal of such an address area until the next address area in longitudinal direction is scanned.

From FIG. 3 it can be seen, that there is a large transverse distance between address marks such as 33 and 35, i.e. three times the track pitch (distance between centre lines of adjacent tracks), because of the presence of portions free of address marks. When scanning the left shared marks 33 from said first track 36 at a distance of 1/2 track pitch, a read signal is generated weaker then a read signal from marks positioned centrally on a track, but still acceptable. However, as the distance to the address marks 35, which are not to be read, is 5/2 track pitch, any crosstalk is sufficiently reduced.

Figure 4:
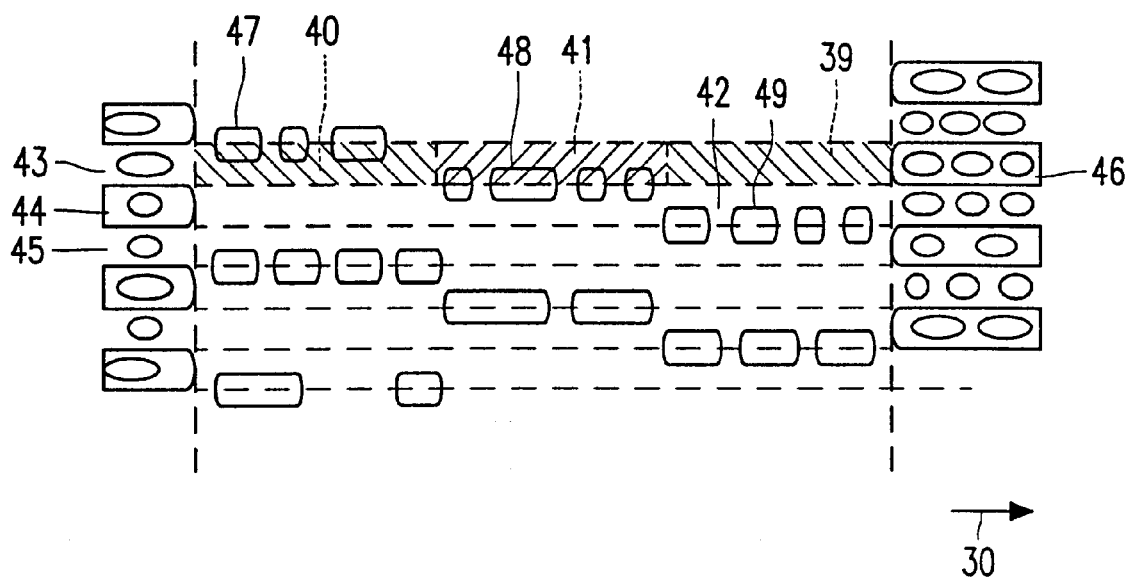

FIG. 4 shows a further embodiment of a track pattern and aligned address areas. In this embodiment a land/groove pattern is used and the address areas constituting the switching point for land to groove and vice versa are shown. Such a switching point is required at least once each turn of a spiral pattern. In FIG. 4 a first land 43 is continued as a groove 46 after the address area. A first groove 44, adjacent to land 43, is continued as land, etcetera. The address areas are subdivided in three portions constituting a sequence of free and sharing portions. A pattern of different sequences is repeated every three tracks. A first address area on the extension of the centre-line of the first land 43, first has left shared address marks 47 in a left sharing portion 40, then right shared marks 48 in a right sharing portion 41 and finally a free portion 39, so the sequence is left+right+free. The free portion 39 is aligned with a sharing portion 42 of a second track 44, adjacent to the right. The second track on the extension of the centre-line of the first groove 44, starts with a free portion, then has left shared address marks 48 in left sharing portion, and finally right shared marks 49 in right sharing portion 42, i.e. the sequence is free +left +right.

The third track on the extension of the centre-line of the second land 45, first has a right shared marks in right sharing portion, then a free portion, and finally left shared address marks 49 in left sharing portion, i.e. the sequence is right +free +left. Each address area has a left and a right sharing portion, enabling comparison of read signals for offset detection in each address area. The division of the address areas in three portions results in more overhead than the division in two portions shown in FIG. 3. However the embodiment of FIG. 4 has the advantage, that more read signals are available for offset detection and each address area has at least two portions with shared address marks. It is to be noted, that for a land/groove pattern further address areas in a turn may be also switching points (as an odd number is required) or may be in-line, i.e. land continues as land and groove as groove. The in-line address areas may have the same sequence of address marks.

Further combinations of address marks may be formed using the rule applied above, i.e. for at least one portion of the address area comprising shared address marks the portion of the track adjacent to the other side is free of address marks. For example, an additional portion of the address area may have address marks centred on the track, so that only part of the address area is used for shared portions and free portions. The portion adjacent to the portion having the centred marks may then be a free portion. An embodiment using such a fourth type of portion allows sequences like: left+centre+right+free. Alternatively, an address area may have one portion only, while the type of consecutive address areas in scanning direction is different, e.g. the first address area only has left shared marks, the next address are has right shared marks, the next is free from marks, and then the pattern repeats itself.

The address marks as shown schematically in FIGS. 3 and 4 may have a width of approximately the track pitch. Usually the marks in the recordable tracks are constituted by amplitude effects having a width of approximately the track pitch and the address marks are formed by phase effects, i.e. pits of the same width or somewhat narrower than the track pitch. The phase effects generate a stronger crosstalk then the amplitude effects. Wider address marks would result in a stronger read signal and a more reliable address information recovery. In the prior art systems such as described in D1 wider address marks would result in severe crosstalk. However in an embodiment of the record carrier according to the invention the address marks are substantially wider than the track pitch, so that a stronger read signal is generated when scanning the shared address marks. Offset detection is still possible for marks only partially illuminated, i.e. having a width less then about twice the track pitch. A width of 1,5 times the track pitch is a practical value. Using the wider address marks gives a stronger read signal and no significant increase in crosstalk, as the distance from a track to unwanted address marks is relatively large, and therefore results in a better signal to noise ratio.

Figure 5:
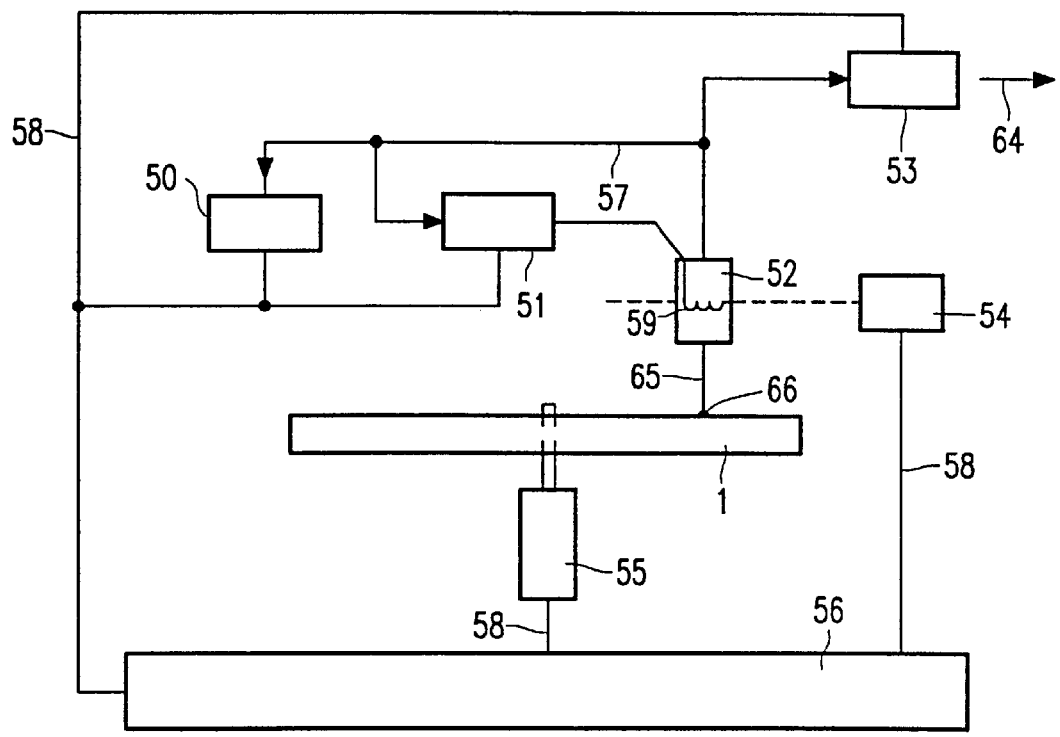
FIG. 5 shows an apparatus for reading a record carrier
Figure 6:
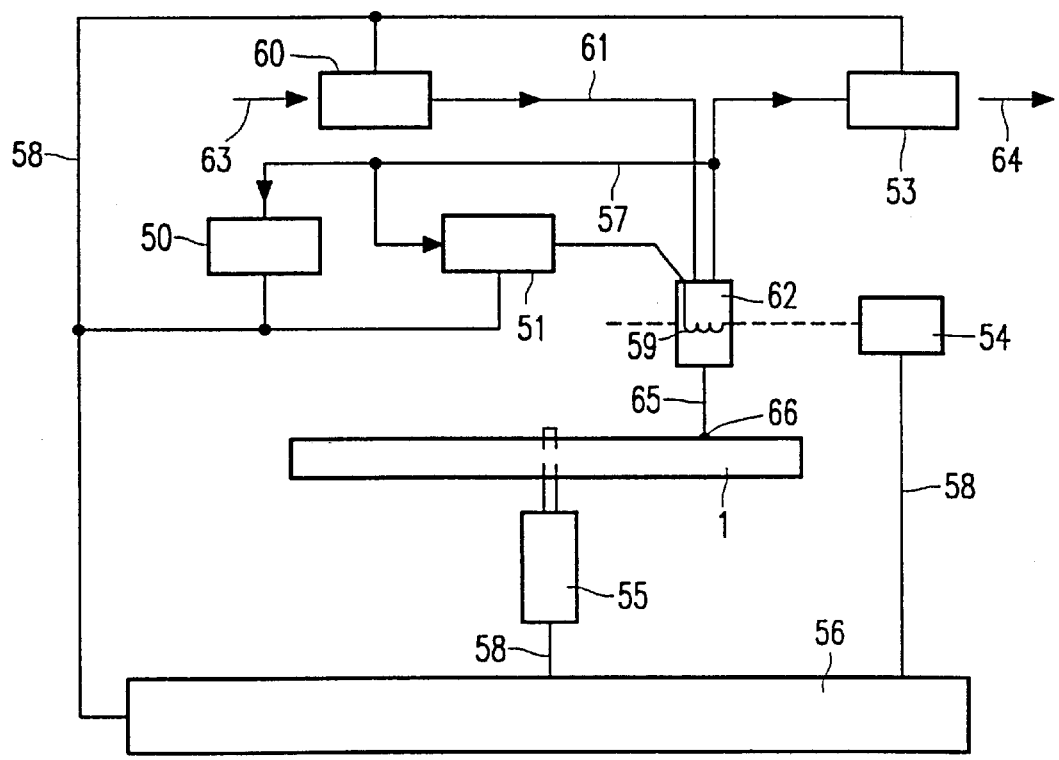
FIG. 6 shows an apparatus for writing and reading a record carrier

FIGS. 5 and 6 show apparatuses according to the invention for scanning a record carrier 1. The apparatus of FIG. 5 is arranged for reading the record carrier 1, which record carrier is identical to the record carrier shown in FIG. 1. The device is provided with drive means 55 for rotating the record carrier 1, and a read head 52 for scanning the track on the record carrier. The read head comprises an optical system of a known type for generating a radiation spot 66 focused on a track of the recording layer of the record carrier via a radiation beam 65 guided through optical elements. The radiation beam 65 is generated by a radiation source, e.g. a laser diode. The read head further comprises a focusing actuator for focusing the radiation beam 65 on the recording layer and a tracking actuator 59 for fine positioning of the spot 66 in radial direction on the centre of the track. The tracking actuator 59 may comprise coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g. a four-quadrant diode, for generating a detector signals 57 including a read signal, a tracking error and a focusing error signal. The apparatus is provided with tracking means 51 coupled to the read head for receiving the tracking error signal from the read head and controlling the tracking actuator 59. During reading, the read signal is converted into output information, indicated by arrow 64, in the reading means 53, for example comprising a channel decoder and an error corrector. The apparatus is provided with an address detector 50 for detecting the address areas and retrieving address information from the detector signals 57 when scanning the address areas of the tracks of the record carrier and with positioning means 54 for coarsely positioning the read head 52 in the radial direction on the track. The device is further provided with a system control unit 56 for receiving commands from a controlling computer system or from a user and for controlling the apparatus via control lines 58, e.g. a system bus connected to the drive means 55, the positioning means 54, the address recovery means 50, the tracking means 51 and the reading means 53. To this end, the system control unit comprises control circuitry, for example a microprocessor, a program memory and control gates, for performing the procedures described below. The system control unit 56 may also be implemented as a state machine in logic circuits.

The system control unit 56 is arranged to perform the address information recovery and positioning procedure as follows. A desired track address is derived from a command received from the user or from a controlling computer. The distance from the current position to the desired track is determined and a control signal is generated for positioning means 54 to radially move the read head 52 to the desired track. When the radial movement is completed an address area is read by the address detector 50. The read signal of the address area is processed in portions and for each portion it is determined if the portion comprises shared address marks. The amplitude of the read signal may be used to determine the presence or absence of shared address marks. If a portion of the read signal does not comprise address marks, it is skipped, and if a portion of the read signal comprises address marks, such a portion is decoded for recovering address information. In the case of a record carrier having address areas comprising several sharing portions, e.g. left and right sharing portions as described with FIG. 4, each portion is read and decoded separately. Part of the address information may be repeated in said several portions, and may be used for verification or error correction of the address information. The complete address information is recovered combining the recovered address information from the read signal from the several sharing portions of one address area.

Preferably the system control unit 56 is arranged for identifying the sequence of portions. The sequence of the at least one sharing portion and the free portion is easily derived from the read signal. Depending on the detector system also the left and right shared address marks may be distinguishable, or the preceding track may be identified as land or groove using the tracking error signals. A relationship between the address value and the sequence (and the type of the preceding track) may be fixed for a specific type of record carrier, e.g. by standardisation. The relationship may also be pre-recorded with other recording information such as laser power in a system area of the disk or in a modulation of the pregroove, such as in CD-R and CD-RW and described in document U.S. Pat. No. 4,901,300 (D2). As the relationship between the sequence and the address must comply with the given relationship, read errors in the address marks may be detected.

In a further embodiment the system control unit 56 is arranged for adjusting the tracking offset as follows. The address detector 50 determines the level of the read signals of different portions of the address area. It is to be noted, that in the prior art device as described in document D1 there is only one fixed order of left and right shared marks, i.e. after a land always first left and thereafter right shared address marks follow, and therefore the direction of the tracking offset is known if the first read signal differs from the second read signal. However, in the apparatus of FIG. 5 the system control unit has to identify which portion comprises left or right shared address marks, e.g. by detecting the side on which the address marks are shared or by deriving the side from a predetermined pattern of sequences related to the address value or the angular position within a turn of the track. The level of the read signal of a portion identified as comprising left shared marks is compared to the level of the read signal of a portion comprising right shared marks. When the level of the left read signal is higher, an offset of the spot 66 to the left side is detected and a corrective signal is applied to the tracking means 51 via the control lines 58. The level difference may alternatively be detected by dedicated circuitry coupled directly between the address detector 50 and the tracking means 51.

The levels of the read signal may be determined when scanning one address area, or they may be kept in memory from portions of consecutive address areas and compared when a level of left and right shared address marks is available. This is required, for example, when scanning the track 36 of the record carrier as described with FIG. 3, as the address area only has left shared address marks 33. Preferably the relationship of the address values and corresponding sequences of portions is chosen such, that when a specific address area only has left shared address marks, the next address area at least has right shared address marks or vice versa.

FIG. 6 shows a device for writing information on a record carrier according to the invention of a type which is (re) writable in, for example a magneto-optical or optical manner (via phase change) by means of a beam 65 of electromagnetic radiation. The device comprises the same elements as the apparatus for reading described above with FIG. 5, except that it has a write/read head 62. The write/read head 62 has the same function as the read head 52 together with a write function and is coupled to writing means 60, which comprise for example a formatter, an error coder and a channel coder. The information presented to the input of the writing means 60 (indicated by the arrow 63) is distributed over logical and physical sectors according to formatting and encoding rules and converted into a write signal 61 for the write/read head 62. The system control unit 56 is arranged for controlling the writing means 60 and for performing the address information recovery and positioning procedure as described above for the reading apparatus. During the writing operation, marks representing the information are formed on the record carrier. Writing and reading of information for recording on optical disks and usable formatting, error correcting and channel coding rules, are well-known in the art, e.g. from the CD system.

Although the invention has been explained by embodiments using two or three portions in each address area, either free or sharing portions, it will be clear that other combinations can be employed in the invention. For example, only one address area in each turn has three portions, while further address areas in that turn only have one portion having non-shared address marks positioned on the centre line, or a repeating pattern of one-portion address areas, i.e. a first address area having left shared address marks, a second having right shared address marks and a third being free of marks. Also a greater distance to unwanted address marks may be created by aligning a further free portion of an address area of the next adjacent track to the free portion of the adjacent track, so the distance to the unwanted address marks is 7/2 times the track pitch. Further, the invention lies in each and every novel feature or combination of features.

LIST OF RELATED DOCUMENTS (D1) EP-A 0 727 779

(D2) U.S. Pat. No. 4,901,300 (PHN 12.398)

What is claimed is:

1. A record carrier comprising:
   substantially parallel tracks for recording optically readable marks representing information, the tracks being divided in longitudinal direction into recording units;
   address areas within the recording units, the address areas of adjacent tracks being substantially aligned in a direction transverse to the tracks;
   sharing portions within the address areas, the sharing portions containing sequences of shared address marks representing address information, the shared address marks being positioned in between substantially aligned sharing portions of the adjacent tracks to be readable from both adjacent tracks to share the address marks, the sharing portion sharing address marks with only one other sharing portion of the adjacent tracks;
   a free portion in at least one address area, the free portion being free from shared address marks, the free portion being transversely aligned with a sharing portion of an adjacent address area, the sequence of the free and the at least one sharing portion within an address area being different in the adjacent address areas;
   and wherein the transverse distance between centerlines of different shared address mark sequences being at least 3 times the track pitch.

2. The carrier of claim 1, characterized in that at least one address area includes a left sharing portion sharing address marks with the track adjacent on one side and a right sharing portion sharing address marks with the track adjacent on the other side.

3. The carrier of claim 2, characterized in that each address area comprises one left sharing portion, one right sharing portion and one free portion.

4. The carrier of claim 1, characterized in that the record carrier includes grooves and lands both serving as tracks, the address areas being flat areas interrupting the grooves and lands.

5. The carrier of claim 1, characterized in that the shared address marks are substantially wider than optically readable marks recorded in the tracks.

6. Apparatus for scanning a record carrier, the record carrier comprising:
   substantially parallel tracks for recording optically readable marks representing information, the tracks being divided in longitudinal direction into recording units;
   address areas within the recording units, the address areas of adjacent tracks being substantially aligned in a direction transverse to the tracks;
   sharing portions within the address areas, the sharing portions containing sequences of shared address marks representing address information, the shared address marks being positioned in between substantially aligned sharing portions of the adjacent tracks to be readable from both adjacent tracks to share the address marks, the sharing portion sharing address marks with only one other sharing portion of the adjacent tracks;
   a free portion in at least one address area, the free portion being free from shared address marks, the free portion being transversely aligned with a sharing portion of an adjacent address area, the sequence of the free and the at least one sharing portion within an address area being different in the adjacent address areas;
   and wherein the transverse distance between centerlines of different shared address mark sequences being at least 3 times the track pitch;

which apparatus comprises:
   an optical system for detecting the optically readable marks by generating a spot on the record carrier via a radiation beam;
   tracking means for controlling the position of the spot in a direction transverse to the tracks,
   address recovery means for recovering the address information by reading the shared address marks in the at least one sharing portion of the address areas; and
   positioning means for moving the spot to a desired track on the basis of the address information, characterized in that the address recovery means are arranged for detecting the free portion of the address area and deriving the sequence of the free and the at least one sharing portion.

7. The apparatus of claim 6, characterized in that the address recovery means are arranged for verifying the address information depending on the sequence of the free and the at least one sharing portion.

8. The apparatus of claim 6, characterized in that the address recovery means are arranged for comparing a left read signal from address marks being shared with the track adjacent on one side and a right read signal from address marks being shared with the track adjacent on the other side and in that the tracking means are arranged for controlling the position of the spot depending on the comparison.

* * * * *